United States Patent [19]

Torterotot

[11] Patent Number: 5,262,181
[45] Date of Patent: Nov. 16, 1993

[54] APPARATUS FOR FORMING HOLLOW ARTICLES IN THERMOPLASTIC MATERIAL

[75] Inventor: Roland Torterotot, Longvilliers, France

[73] Assignee: ERCA Holding, Les Ulis Cedex, France

[21] Appl. No.: 987,548

[22] Filed: Dec. 8, 1992

Related U.S. Application Data

[63] Continuation of Ser. No. 697,876, May 9, 1991, abandoned.

[30] Foreign Application Priority Data

May 14, 1990 [FR] France ................... 90 06003

[51] Int. Cl.$^5$ .............................. B29C 51/00
[52] U.S. Cl. ..................... 425/387.1; 264/549; 264/550; 422/291; 425/388; 425/398
[58] Field of Search .............. 264/549, 550, 553, 554; 422/26, 291, 307; 425/387.1, 388, 394, 398, 403, 405.1; 99/467; 426/521

[56] References Cited

U.S. PATENT DOCUMENTS

| | | | |
|---|---|---|---|
| 3,342,914 | 9/1967 | Edwards | 425/388 |
| 3,450,807 | 6/1969 | Cheney | 425/388 |
| 3,749,542 | 7/1973 | Shelby | 425/388 |
| 3,814,784 | 6/1974 | Wolf | 264/550 |
| 3,954,374 | 5/1976 | Wommelsdorf et al. | 425/388 |
| 4,383,815 | 5/1983 | Kiefer et al. | 425/388 |
| 4,443,401 | 4/1984 | Turner | 425/388 |
| 4,464,329 | 8/1984 | Whiteside et al. | 425/388 |
| 4,521,175 | 6/1985 | Meddved | 425/387.1 |
| 4,552,717 | 11/1985 | Murley et al. | 264/549 |
| 4,600,376 | 7/1986 | Gillman et al. | 425/388 |
| 4,668,175 | 5/1987 | Martin | 264/549 |
| 4,822,553 | 4/1989 | Marshall | 264/549 |
| 4,883,633 | 11/1989 | French | 425/387.1 |
| 4,927,591 | 5/1990 | Nilsson | 425/387.1 |
| 4,943,406 | 7/1990 | Bocchi | 425/388 |

FOREIGN PATENT DOCUMENTS

| | | |
|---|---|---|
| 2754816 | 6/1978 | Fed. Rep. of Germany . |
| 1495851 | 9/1967 | France ................... 425/388 |
| 2028281 | 10/1970 | France . |

Primary Examiner—Scott Bushey
Attorney, Agent, or Firm—Ladas & Parry

[57] ABSTRACT

Forming apparatus for forming hollow articles from a thermoplastic web wherein a mold block and a countermold block are respectively provided with the same number of forming chambers and cylindrical cavities. Each cylindrical cavity contains a forming punch having an inactive top portion and an active bottom portion, which active bottom portion is suitable for penetrating vertically into the corresponding forming chamber. The inactive portion of each forming punch extends over an axial height that is less than the maximum width of the punch. Each forming punch is surmounted by a guide piston which slides in sealed manner inside the corresponding cylindrical cavity of the countermold block. The annular space beneath the guide piston is suitable for communicating periodically with a source of compressed gas via at least one link duct.

13 Claims, 4 Drawing Sheets

APPARATUS FOR FORMING HOLLOW ARTICLES IN THERMOPLASTIC MATERIAL

This is a continuation of copending application Ser. No. 07/697,876 filed on May 9, 1991 now abandoned.

The present invention relates to apparatus for forming hollow articles such as receptacles from a thermoplastic web which is prior heated to a temperature suitable for thermoforming.

BACKGROUND OF THE INVENTION

Such forming apparatus is described in patent FR-2 028 281 and comprises: firstly, beneath the horizontal path of a thermoplastic web, a mold block vertically movable between a high position for thermoforming receptacles, in which position said mold block is pressed against said web, and a low position for unmolding said receptacles, the mold block being provided with at least one forming chamber open to the top thereof and having the same inside shape as the article or receptacle to be thermoformed; and secondly, above said horizontal path, a counter-mold block which may be fixed or free to move a little vertically between a high position in which the bottom end of the counter-mold block is raised a little from the horizontal path of the thermoplastic web, and a low position in which said bottom end is in contact with said thermoplastic web and urges it against the top end of the mold block when in its high position, i.e. against the top edge of each of the forming chambers. The counter-mold block is provided with as many cylindrical cavities as the mold block has forming chambers, with each chamber being axially aligned with a corresponding one of said cavities.

In that type of prior apparatus, a forming punch is mounted to move vertically inside each cylindrical cavity with a degree of lateral clearance relative to the inside face of the cavity and coaxially relative both to said cavity and to the corresponding forming chamber. The forming punch has an inactive top portion and an active bottom portion, with the inactive portion of the punch remaining inside the cylindrical cavity while its active portion is suitable for penetrating into the corresponding forming chamber down to the vicinity of the bottom thereof, and has dimensions that are similar to but smaller than the dimensions of the forming chamber, with the annular space delimited between the peripheral face of the forming punch and the inside faces of both the forming chamber and the cylindrical cavity being periodically connected to a source of compressed gas.

In that type of prior forming apparatus, the active portion of the forming punch is surmounted by a cylindrical inactive portion of a diameter identical to that of the top end of said active portion, and of height that is not less than the vertical stroke of said active portion. As a result, considerable mass needs to be accelerated and decelerated at the beginning and at the end of each downstroke and of upstroke of the forming punch, and this prevents the number of strokes that the punch can perform per unit time being increased. Another drawback of that prior apparatus lies in the fact that the inactive portion of the forming punch is very long, i.e. its height is not less than the height of the active portion of said punch, and the volume of the annular space around the inactive portion of the punch constitutes a considerable dead volume in which large quantities of compressed gas are needlessly consumed. In addition, the annular space surrounding the forming punch and delimited by the punch and the inside face of the cylindrical cavity of the counter-mold block cannot be hermetically sealed at the end of the punch downstroke, and as a result the compressed gas for pressing a determined zone of the thermoplastic web against the inside face of the forming chamber can only be injected into said annular space when the punch stops at the end of its downstroke.

An object of the present invention is to eliminate or at least to mitigate the above-mentioned drawbacks.

SUMMARY OF THE INVENTION

This object is achieved in a forming apparatus of the type specified initially by the facts that the inactive portion of each forming punch extends over an axial height that is shorter than the maximum width of said punch, that each forming punch is surmounted by a guide piston which slides in sealed manner inside the corresponding cylindrical cavity of the counter-mold block, and that the annular space beneath the guide piston is suitable for communicating periodically with a source of compressed gas via at least one link duct.

By virtue of this design, the masses put into motion, and the amount of gas consumed, are both reduced and it is possible to inject gas into the annular space even during the downstroke of the forming punch.

This novel forming apparatus is also highly advantageous when used in the context of a conventional type of sterile packaging installation, e.g. as described in German patent application DT-OS 2 754 816.

The invention also provides a method of forming hollow articles such as receptacles from a thermoplastic web. In a prior forming method, successive determined zones of the thermoplastic web are preheated to the thermoforming temperature, the edge of at least one preheated zone of the thermoplastic web is clamped between the top end of a bottom mold block containing at least one forming chamber and the bottom end of a top counter-mold block including at least one cylindrical cavity which is in alignment with said forming chamber and which receives with lateral clearance a forming punch which is disposed coaxially with said forming chamber and which is vertically movable between a high position in which its bottom end is fully retracted into said cylindrical cavity and a low position in which said bottom end of the punch comes close to the bottom of the forming chamber when the forming chamber is in its high, thermoforming position, with a hollow article being thermoformed from the zone of the web which is clamped via its edge by thrusting said zone of the web into the forming chamber by means of the forming punch, and by injecting a gas under pressure into the volume delimited by said clamped zone of the web, the forming punch, and the cylindrical cavity so as to apply said clamped zone of the web against the inside face and the bottom of the forming chamber.

The drawbacks of this prior method are the same as those mentioned above with respect to the prior forming apparatus described in French patent FR-2 028 281.

An object of the invention is to eliminate these drawbacks. In the context of a forming method as specified above, this object is achieved by the fact that prior to the operation of thermoforming a hollow article or receptacle, the annular space delimited by the preheated zone of the thermoplastic web clamped at its edge between the mold block and the counter-mold block, by the outside face of the forming punch, and by the inside face of the cylindrical cavity, is closed hermetically, with said hermetically-closed space being maintained throughout the downstroke of the forming punch, and gas under pressure is injected into said hermetically-closed space not later than the end of the downstroke of the forming punch.

Because of these measures, consumption of compressed gas is reduced and the rate at which receptacles can be thermoformed is increased. In addition, the gas enclosed in the volume delimited by the guide piston, the forming punch, the zone of the thermoplastic web, and the inside face of the cylindrical cavity forms a kind of lubricating film on the surface of the punch which facilitates flow and stretching of said zone by preventing thermoplastic material therein adhering to the outside of said punch.

U.S. Pat. No. 3,450,807 (G. W. Cheney) describes apparatus for forming hollow articles such as receptacles from a thermoplastic sheet. The apparatus comprises a guide enclosure disposed over the mold block and slidably receiving a piston in sealed manner, which piston surmounts and is integral with the forming punch. However, this prior forming apparatus belongs to a category of apparatus different from the apparatus of the invention since: (1) the prior apparatus cannot clamp the thermoplastic web between the top edge of the forming chamber provided in the mold block and the bottom edge of the guide enclosure which may be taken as being equivalent to the cylindrical cavity of the counter-mold block of the apparatus of the invention; (2) its guide piston is shaped as a cutting tool that co-operates with the cutting edge of an annular groove provided in the top edge of the mold block; and (3) the outside diameter of the annular space provided between the guide enclosure and the forming punch and delimited at the top by the guide piston is larger than the maximum diameter of the receptacle forming chamber.

In addition, since the prior apparatus is designed to stretch the thermoplastic sheet prior to transforming part of it into a receptacle, the forming punch includes a series of channels below the guide piston and connected alternately to a vacuum source for stretching the thermoplastic sheet, causing it to bulge into the guide enclosure and pressing it against the bottom and part of the periphery of the forming punch, and to a source of compressed gas for then pressing the thermoplastic sheet against the side wall and the bottom of the forming chamber in the mold block.

This prior apparatus does not lend itself to thermoforming a receptacle by using a forming punch and compressed gas without prior stretching of the thermoplastic sheet either by sucking the sheet against said punch under the action of suction acting on the top side of the sheet, which face subsequently constitutes the inside face of the receptacle, or else by applying said sheet against said punch under the action of higher pressure acting on the bottom face of said sheet, which face subsequently constitutes the outside face of said receptacle.

In addition, in said prior apparatus, the thermoplastic material of the clamped sheet must be pressed against the forming punch so as to cover its bottom face and its periphery completely before compressed gas can be used to press said thermoplastic material against the inside face of the forming chamber. As a result, receptacle manufacturing throughput is low.

Further, since the thermoplastic sheet is clamped between two grips outside the guide enclosure and the edge of the forming chamber, and since the formed receptacle is cut out inside the zone in which the thermoplastic sheet is clamped, use of the prior apparatus gives rise to very high wastage of thermoplastic material.

BRIEF DESCRIPTION OF THE DRAWINGS

Embodiments of the invention are described by way of example with reference to the accompanying drawings, in which.

DETAILED DESCRIPTION

Figure 1:
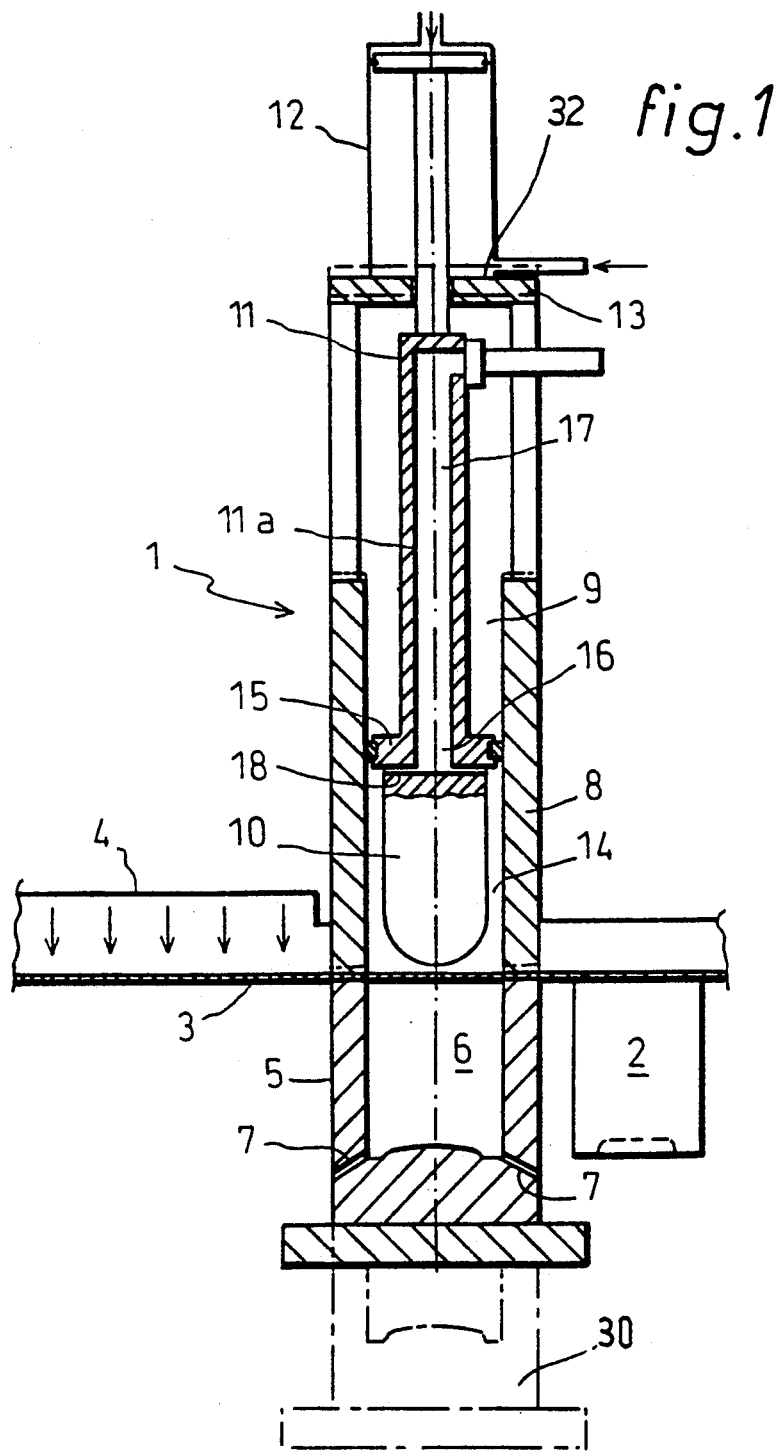
FIGS. 1 and 2 are elevation views in vertical axial section through a first embodiment of the forming apparatus.

The apparatus 1 for forming hollow articles or receptacles 2 and as shown in the drawings serves to thermoform said receptacles 2 from a thermoplastic web 3 following a horizontal path. In general, the forming apparatus 1 forms a part of a packaging installation of conventional type, e.g. as described in French patent FR 2 028 765 or German patent application DE-OS 2 754 816, and it is located immediately downstream from a heater apparatus 4 for heating the thermoplastic web 2 as it advances stepwise beneath the heater apparatus 4 where it is raised to thermoforming temperature, and then through the forming apparatus 1.

Beneath the horizontal path of the thermoplastic web 3, the forming apparatus 1 comprises a mold block 5 which is vertically movable between a thermoforming high position shown in solid lines in the drawing, and an unmolding low position shown at 30 in dotted lines in FIG. 1 in which the receptacle 2 which has just been thermoformed and unmolded can be advanced by one step allowing a new length of thermoplastic web to be inserted in the forming apparatus 1, since the top end of the mold block 5 is then lower than the bottom of the receptacle 2. The mold block 5 includes at least one forming chamber 6 open at its top end and having an inside shape which is identical to the outside shape of the receptacle 2 to be thermoformed, it being understood that the opening of said chamber 6 is of sufficient cross-section to enable said receptacle 2 to be unmolded. Air evacuation orifices 7 are formed through the mold block 5 and open out into the bottom of the forming chamber 6 to connect it to the atmosphere or to a vacuum pump.

Figure 2:
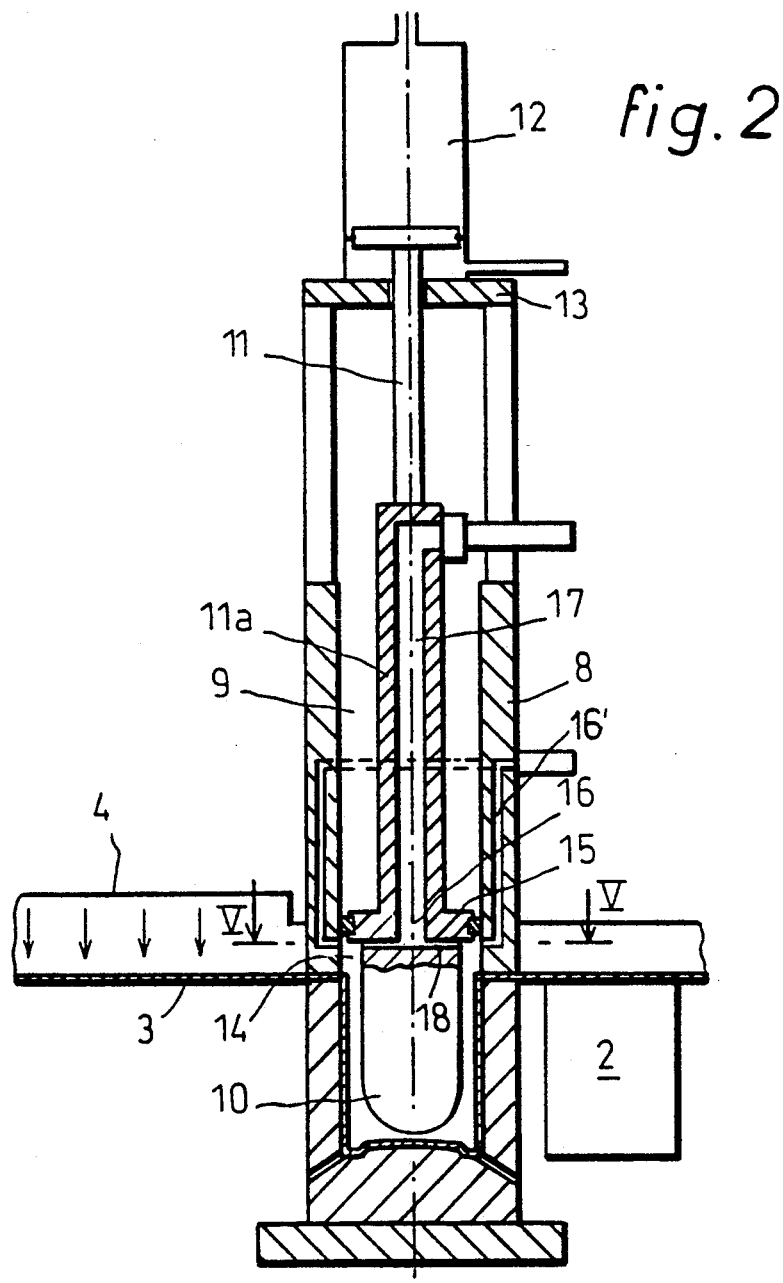
Figure 4:
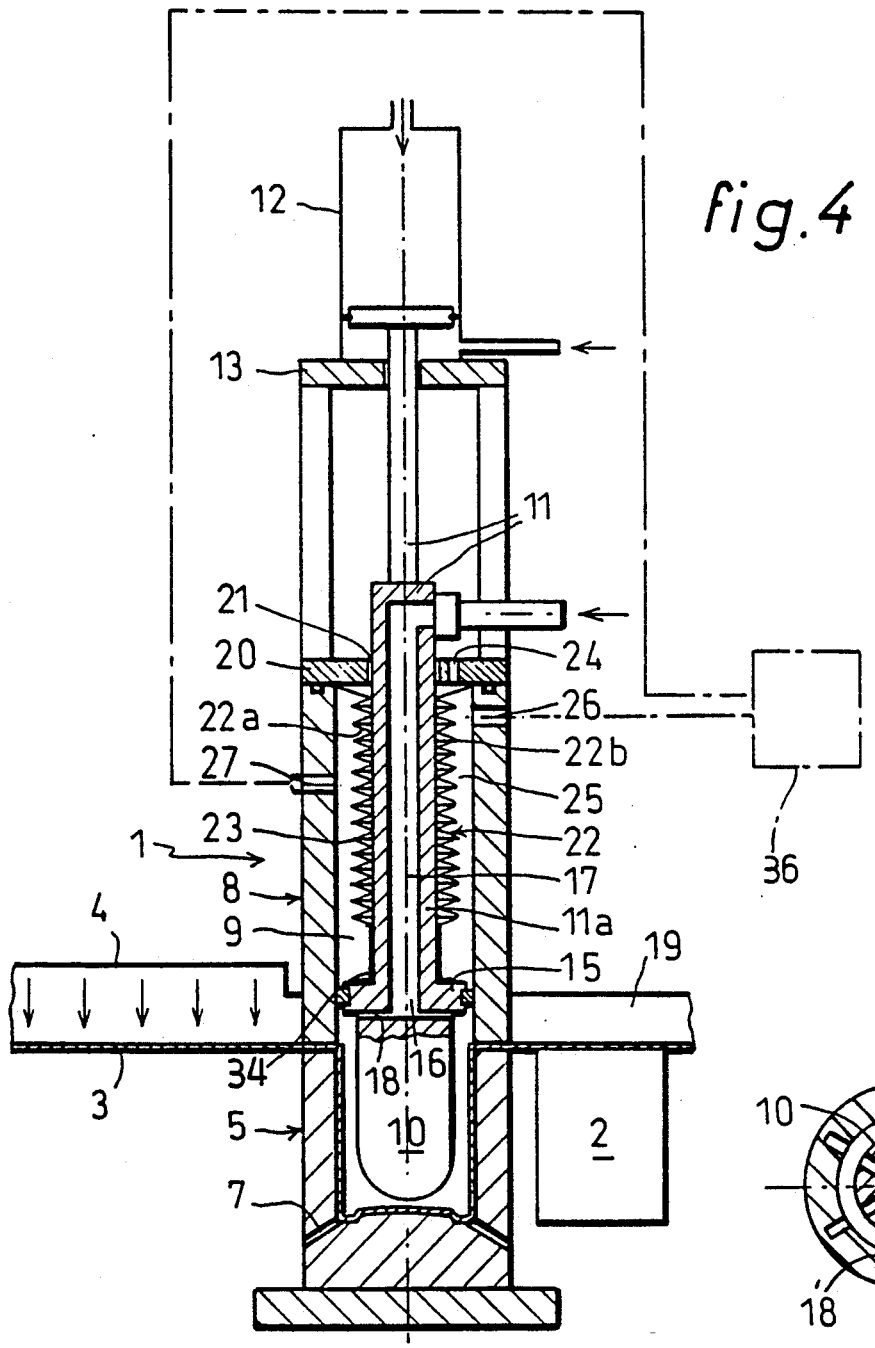

Above the horizontal path of the thermoplastic web 3, the forming apparatus 1 further includes a counter-mold block 8 which is either fixed in position or else is vertically movable over a short distance between a low position as shown in solid lines in the drawing where it comes into contact with the thermoplastic web 3 and clamps it against the top edge of each forming chamber 6 when the mold block 5 is in its high position, and its own high position shown at 32 in dotted lines in FIG. 1 which is raised slightly above the horizontal path of the thermoplastic web so as to facilitate advancing the web. The counter-mold block 8 is provided with as many cylindrical cavities 9 as the mold block 5 has forming chambers 6, with these cavities 9 being disposed in alignment with the forming chambers 6. In the first embodiment shown in FIGS. 1 and 2, these cylindrical cavities 9 are open at both ends. Each cylindrical cavity 9 contains a forming punch 10 which is coaxial with said cavity 9 and with the corresponding forming chamber 6, and which is vertically movable, e.g. under drive from a control rod 11 forming a part of a control actuator 12 mounted on an external frame 13. The forming punch 10 has an "inactive" top portion that does not participate directly in the forming of the receptacle 2, and an "active" bottom portion that does participate in forming said receptacle 2. It should be observed that the inactive top portion of the forming punch 10 always remains inside the cylindrical cavity 9 and outside the forming chamber 6, whereas the active bottom portion of said punch 10 is capable of penetrating vertically into the forming chamber 6 and of pushing against the zone of thermoplastic web which is clamped at its edge between the mold block 5 and the counter-mold block 8 around the top opening of said chamber 6 (see FIGS. 2 and 4). The cross-section of the inactive portion of the forming punch 10 is smaller than that of the cylindrical cavity 9 while the active portion of said punch 10 is similar in size but smaller than the corresponding forming chamber 6.

As can be seen in the drawings, a degree of lateral clearance exists between the outside of the forming punch 10 and both the cylindrical cavity 9 and the forming chamber 6. An annular space 14 is delimited in each cylindrical cavity 9 by the inside face thereof and by the outside face of said punch 10. Each forming punch 10, and more precisely the inactive top portion thereof, is surmounted by a guide piston 15 which closes the top end of the annular space 14 in airtight manner and which is larger in cross-section than is the punch 10 so as to fit inside the cylindrical cavity, thereby enabling said piston 15 to slide therein in sealed manner under the action of the control actuator 12 and of its rod whose bottom end is fixed to said piston 15. The annular space 14 is periodically connected to a source of compressed gas such as compressed air, which may be sterile if so required, by means of at least one link duct 16 opening out into the annular space either close to the bottom end of the counter-mold block 8, or else close to the top end of the forming punch 10. A control valve (not shown) is interposed in the optionally sterile compressed gas feed circuit between the link duct 16 and the source of compressed gas.

The inactive top portion of the forming punch 10 extends over an axial height that is smaller than the maximum width of said punch 10 and is preferably fairly small while remaining large enough for the guide piston 15 to be kept far enough away from the path of the thermoplastic web 3 when the forming punch 10 is in its low position. Advantageously, the axial height of the inactive top portion of the forming punch 10 lies in the range of one-tenth to five-tenths of the maximum width of said punch 10.

Figure 5:
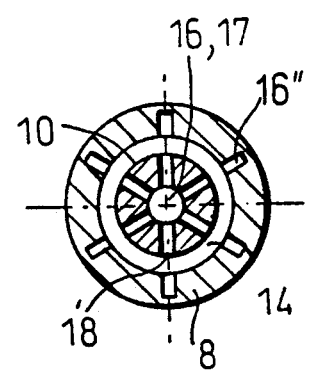
FIG. 5 is a plan view in horizontal section through the forming punch on line V—V of FIGS. 2 and 4.

The link duct(s) 16 may be provided in the guide piston 15 close to the periphery thereof so as to have axes parallel to the piston 15 and the punch 10, and to open out directly into the top end of the annular space 14. Under some circumstances, it may be advantageous to form the link duct(s) in the side wall of the counter-mold block 8 as shown at 16' in FIG. 2 so that these ducts open out either radially or else obliquely into the annular space 14 close to the bottom end of said block 8 at ducts 16'' as shown in FIG. 5, with the axes of the openings of these ducts 16'' being preferably situated in a plane perpendicular to the axis of the punch 10 and of the piston 15.

The control rod 11 lies on the same axis as the forming punch 10 and its bottom end is fixed to the side of the guide piston 15 furthest from the said punch 10. A portion of this bottom end which is slightly longer than the height of the cylindrical cavity 9, or the height of the assembly constituted by the punch 10 and the piston 15, has an axial channel 17 whose top end situated outside the cylindrical cavity 9 is alternately connected to the atmosphere and to a source of compressed air via a valve (not shown). In this case, the link duct 16 formed through the guide piston 15 is in alignment with the coaxial channel 17 and penetrates a short distance into the inactive portion of the forming punch 10 and is connected firstly to the bottom end of the coaxial channel 17 and secondly to the central ends of a plurality of radial channels 18 formed horizontally through the inactive portion of the forming punch 10 and opening out into the vicinity of the bottom face of the piston 15 in the peripheral face of the forming punch 10.

It should be observed that insofar as the jets of compressed gas are injected into the annular space 14 either in a plane perpendicular to the axis of the forming punch 10 and of the piston 15, or else along directions that are steeply sloping relative to said plane, these jets break firstly inside the annular space 14 either against the inside face of the cylindrical cavity 9 or else against the outside of the punch 10 before being deflected towards the clamped zone of the thermoplastic web 3a and the inside of the forming chamber 6. This ensures that the jets of compressed air are never directed directly against the thermoplastic web which they might puncture.

The forming apparatus 1 may also advantageously be used in a sterile packaging installation for goods that are sterile or sterilized, in particular in an installation of the type described in German patent application DT-OS 2 754 816. To this end, the bottom end of the counter-mold block 8 is mounted in sealed manner to the sterile tunnel 19 of a packaging installation, with the tunnel 19 having vertical side walls that co-operate with the sides of the thermoplastic web 3 so as to avoid excessive leakage of sterile gas that fills the volume delimited by said tunnel 19 and which is at a small positive relative pressure. The bottom end of the counter-mold block 8 penetrates in airtight manner into the sterile tunnel 19. The cylindrical cavity 9 of the counter-mold block 8 is closed at its top end by a cover 20 provided with a central opening 21 through which the bottom length 11a of the control rod 11 is guided. Inside the cylindrical cavity 9, i.e. over the portion of the bottom length 11a that penetrates into the said cavity 9, said bottom length 11a is surrounded in sealed manner by a protective bellows 22 which extends from the cover 20 either down to the guide piston 15 or else down to a point on the bottom point 11a which is close to said piston 15. The bottom end of the protective bellows 22 is fixed in airtight manner either to the piston 15 as shown at 34 in FIG. 4 or else to the bottom end 11a of the control rod 11 close to said piston 15. The top end of the protective bellows 22 is fixed in airtight manner to the cover 20 around its central opening 21, or else it is mounted as a sealing gasket between the top end of the counter-mold block 8 and the bottom face of the cover 20. The structure of the bellows 22 is of conventional type, and inside each of its bellows folds 22a it may contain a stiffening washer 22b surrounding the bottom length 11a in such a manner as to be free to slide therealong. The variable annular volume 23 surrounded by the bellows 22 and essentially delimited by the bottom face of the cover 20, by the inside face of the bellows 22, and by that portion of the bottom length 11a which penetrates into the cylindrical cavity 9, and also, where appropriate, by a portion of the top face of the guide piston 15, is permanently connected to the atmosphere via the central guide opening 21 in the cover 20 and/or via a breathing hole 24 formed through said cover 20 inside the top rim of the bellows 22. The annular chamber 25 provided inside the cylindrical cavity 9 and delimited by the inside face thereof, by the outside face of the protective bellows 22, by the top face of the guide piston 15, and, where appropriate, by the free portions of the bottom length 11a housed inside the cavity 9, and by the bottom face of the cover 20 where not covered by the bellows 22, is fed with gas while the apparatus is in operation and is permanently filled with a sterile gas at a small positive pressure relative to atmospheric pressure, said feed taking place via an inlet orifice 26 formed through the side wall of the counter-mold block 8 close to the cover 20 and connected to a suitable feed circuit which enables the pressure in said annular chamber 25 to be maintained substantially constant in spite of variations in the volume of said chamber 25. It should be observed, that for sterile packaging of goods, the link duct(s) 16, including the radial channels 18 opening out into the annular space 14 and the coaxial channel 17, are periodically connected outside the cylindrical cavity 9 to a source of sterile gas under pressure via a control valve (not shown).

Figure 3:
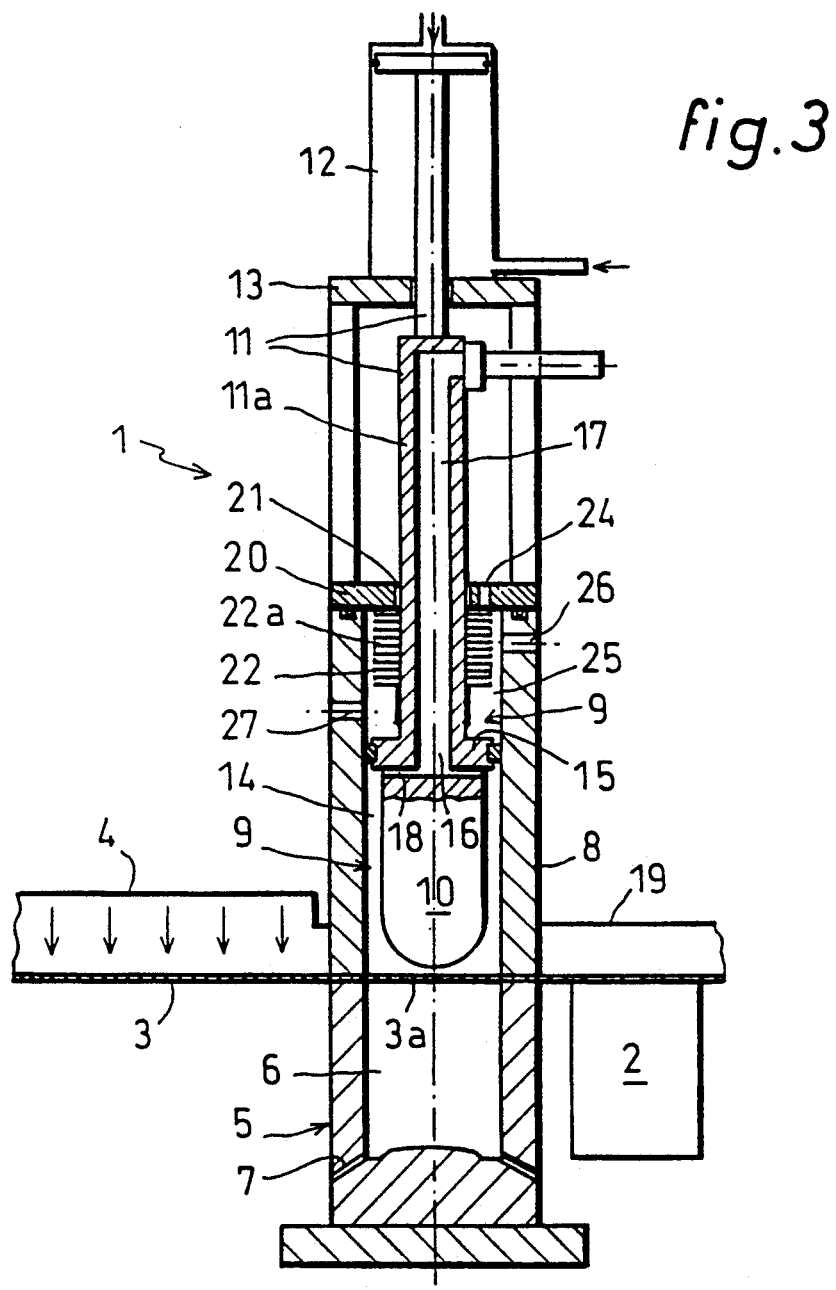
FIGS. 3 and 4 are elevation views in vertical axial section through a second embodiment of the apparatus.

In order to facilitate resterilizing and cleaning of the annular chamber 25 and of all the parts delimiting it, this chamber is suitable for connection to a sterilization circuit 36 (hot water, superheated steam at high pressure) firstly via the inlet orifice 26 and secondly via an outlet orifice 27 provided in the side wall of the counter-mold block 8 at a location which is diametrically opposite the location of the inlet orifice 26 and which is situated slightly above the guide piston 15 when in its high position with the forming punch 10 fully received inside the cylindrical cavity 9 and where the annular folds 22a of the bellows 22 are close together and in mutual contact (FIG. 3). It is advantageous for the forming punch 10 to be coated with a layer of flexible plastic material based on silicone. This makes it possible for the punch 10 to come quickly to a constant temperature at a value close or equal to the temperature of the thermoplastic web 3 during thermoforming, and for it to maintain said temperature.

The method of thermoforming a thermoplastic receptacle 2 using the above-described forming apparatus can be understood from the description. A zone of thermoplastic web 3a preheated to the thermoforming temperature is clamped at its edge between the top end of the mold block 5 surrounding the opening to the forming chamber 6 and the bottom end of the counter-mold block 8 surrounding the cylindrical cavity 9 which then contains the forming punch 10 fully retracted therein. Because of the structure of the apparatus, in particular because of the guide piston 15 provided in the cylindrical cavity 9 above the punch 10, the annular space 14 is closed hermetically as soon as the preheated zone of web 3a is clamped and prior to the operation of thermoforming a receptacle 2 from said zone of web 3a. The volume of this annular space 14 changes during the thermoforming operation with the forming punch 10 being lowered and with compressed gas being injected. Since this annular space 14 is hermetically closed throughout the entire downstroke of the forming punch 10 during which it leaves the cylindrical cavity 9 in part to penetrate into the forming chamber 6 down to the vicinity of the bottom thereof, gas under pressure may be injected therein as soon as said space 14 is closed and gas is injected therein not later than at the end of the downstroke of the forming piston 10. Consequently, if so required for some of the materials constituting the thermoplastic web 3, it is possible to inject gas under pressure into the hermetically closed annular space 14 during the downstroke of the forming piston 10. The compressed gas may be injected into the annular space 14 close to the top end of the punch 10 and beneath the bottom face of the piston 15, or else close to the bottom end of the counter mold block 8 inside the cylindrical cavity 9 thereof. It is advantageous to inject the compressed gas into the annular space 14 in the form of multiple gas jets and to orient them in such a manner as to ensure that they do not strike the clamped zone of web 3a directly. To this end, the gas under pressure is injected in the form of radial jets extending substantially in a plane perpendicular to the axis of the cylindrical cavity 9 and inside said cavity. Under such circumstances, the gas jets are directed either substantially perpendicular to the wall of the cylindrical cavity 9 and towards said wall, or else perpendicular to the axis of said cavity 9 and towards said axis. The gas jets thus begin by striking either the wall of the cavity 9 or else the outside of the forming punch 10 prior to being deflected towards the forming chamber 6 and towards the clamped zone of web 3a.

The person skilled in the art will be able to modify the present invention without going beyond the scope of the protection defined by the accompanying claims.

What is claimed is:

1. Forming apparatus for forming hollow receptacles from a previously heated thermoplastic web which is transported along a horizontal path, said apparatus comprising: a mold block disposed beneath the horizontal path of said thermoplastic web, said mold block being vertically movable between a high position for thermoforming a receptacle from the thermoplastic web and a low position for unmolding thermoformed receptacles, said mold block being provided with a forming chamber having an open top and an inside shape corresponding to that of the receptacle to be thermoformed, and a counter-mold block disposed above said horizontal path of said thermoplastic web, said counter-mold block being movable a short distance vertically between a low position in which it clamps the thermoplastic web against a top edge of said forming chamber, and a high position slightly above said horizontal path of said thermoplastic web; said counter-mold block being provided with a cylindrical cavity in alignment with said forming chamber, a coaxial forming punch in said cylindrical cavity vertically movable and having an inactive top portion which does not enter said forming chamber and an active bottom portion which penetrates vertically into said forming chamber, said punch being of a shape and size similar to but smaller than that of said forming chamber, said forming punch defining with inside surfaces of the forming chamber and of the cylindrical cavity, an annular space, said annular space being periodically connected to a source of compressed gas, said inactive portion of said forming punch remaining in the cylindrical cavity of said counter-mold block and outside said forming chamber during vertical movement of said forming punch and extending over an axial height that is less than a maximum width of said punch, a guide piston surmounting said forming punch, said guide piston being slidable in sealed manner inside said cylindrical cavity of the counter-mold block to close in air tight manner a top end of said annular space, and duct means for periodically connecting said annular space with said source of compressed gas, said duct means opening into said cylindrical cavity at the level of said inactive portion when the forming punch is in a lowest position.

2. Forming apparatus according to claim 1, wherein said duct means comprises at least one duct link in said guide piston through which the annular space is periodically connected to the source of compressed gas.

3. Forming apparatus according to claim 1, wherein said duct means comprises at least one link duct in a side wall of said counter-mold block which opens into said annular space close to a bottom end of said counter-mold block.

4. Forming apparatus according to claim 3, wherein said link duct comprises a plurality of radial channels formed in a side wall of the counter-mold block and opening into said annular space close to the bottom end of said block.

5. Forming apparatus according to claim 1, wherein the axial height of the inactive portion of the forming punch lies in the range of one-tenth to five-tenths of the maximum width of said punch.

6. Forming apparatus according to claim 1, wherein said guide piston includes a control rod on a side thereof opposite the forming punch.

7. Forming apparatus according to claim 6, wherein a bottom length of the control rod extends over a distance which is slightly greater than the height of the cylindrical cavity and is provided with a coaxial channel having a top end connected to a source of compressed gas, said link duct passing through the guide piston in alignment with said coaxial channel and penetrating a short distance into said inactive portion of the forming punch, said link duct being connected both to a bottom end of the coaxial channel and to a plurality of radial channels formed horizontally in said inactive portion of the forming punch, said radial channels opening out in the vicinity of a bottom face of the guide piston at the periphery of said forming punch.

8. Forming apparatus according to claim 7, in which the bottom end of the counter-mold block penetrates in airtight manner into a sterile tunnel of an installation for sterile packaging of goods that are sterile or sterilized, wherein:

the cylindrical cavity of the counter-mold block is closed at its top end by a cover provided with a central opening through which the bottom length of the control rod of the forming punch is guided;

a protective bellows is provided surrounding the portion of said bottom length that penetrates inside the cylindrical cavity in airtight manner, said protective bellows having a bottom end fixed with respect to said guide piston, and a top end mounted on said cover;

said cover defining with an inside face of the protective bellows, and the bottom length of the control rod a variable annular volume permanently connected to the atmosphere;

the outside face of the protective bellows defining with an inside face of the cylindrical cavity and the top face of the guide piston an annular chamber, and means for supplying a sterile gas at a pressure slightly higher than atmospheric pressure to said annular chamber;

said link duct, including said radial channels thereof, being periodically connected outside the cylindrical cavity to a source of sterile gas under pressure.

9. Forming apparatus according to claim 8, wherein the top end of the protective bellows is connected as a sealing gasket between the cover and the top end of the counter-mold block.

10. Forming apparatus according to claim 8, wherein said annular chamber is connected to a sterilization circuit firstly via an inlet orifice provided close to the cover in a side wall of the counter-mold block and secondly via an outlet orifice in said side wall disposed slightly above the guide piston when the latter is raised and the forming punch is fully contained inside the cylindrical cavity, said protective bellows having annular folds which are then pressed close together.

11. Forming apparatus according to claim 1, wherein said forming punch includes a coating layer thereon of flexible plastic material based on silicone.

12. Forming apparatus according to claim 1, wherein said guide piston remains in said counter mold block, when said forming punch is in said lowest position thereof.

13. Forming apparatus according to claim 12, wherein when said forming punch is in said lowest position thereof said guide piston is in said counter mold block at a level above said horizontal path of said thermoplastic web and out of contact with said web.

* * * * *